(12) United States Patent
Basu et al.

(10) Patent No.: US 10,256,515 B2
(45) Date of Patent: Apr. 9, 2019

(54) BATTERY THERMAL MANAGEMENT METHOD AND SYSTEM

(71) Applicant: Samsung Electronics Co., Ltd., Suwon-si (KR)

(72) Inventors: Suman Basu, Bangalore (IN); Krishnan S Hariharan, Bangalore (IN); Nandhini Ganesan, Bangalore (IN); Tae jung Yeo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 181 days.

(21) Appl. No.: 15/204,227

(22) Filed: Jul. 7, 2016

(65) Prior Publication Data

US 2017/0033417 A1 Feb. 2, 2017

(30) Foreign Application Priority Data

Jul. 27, 2015 (IN) ............................ 3838/CHE/2015

(51) Int. Cl.
| | |
|---|---|
| *H01M 10/617* | (2014.01) |
| *H01M 10/633* | (2014.01) |
| *H01M 10/48* | (2006.01) |
| *F28D 15/00* | (2006.01) |
| *B60L 11/18* | (2006.01) |

(52) U.S. Cl.
CPC .......... *H01M 10/633* (2015.04); *F28D 15/00* (2013.01); *H01M 10/486* (2013.01); *B60L 11/187* (2013.01)

(58) Field of Classification Search
CPC .... H01M 10/60; H01M 10/61; H01M 10/613; H01M 10/615; H01M 10/617; H01M 10/63; H01M 10/625; H01M 10/635; H01M 10/486; H01M 10/633; B60L 11/187

See application file for complete search history.

(56) References Cited

U.S. PATENT DOCUMENTS

| | | | |
|---|---|---|---|
| 6,076,964 A | 6/2000 | Wu et al. | |
| 8,166,770 B2 | 5/2012 | Suzuki et al. | |
| 2003/0118891 A1* | 6/2003 | Saito | ....................... B60L 1/003 |
| | | | 429/62 |
| 2012/0094152 A1 | 4/2012 | Wu et al. | |
| 2012/0263999 A1* | 10/2012 | Gunji | ................ H01M 10/0525 |
| | | | 429/156 |
| 2014/0210481 A1* | 7/2014 | Buford | ............... G01R 31/3606 |
| | | | 324/431 |

FOREIGN PATENT DOCUMENTS

| | | |
|---|---|---|
| JP | 9-102331 A | 4/1997 |
| JP | 2008-105605 A | 5/2008 |
| JP | 2008-153278 A | 7/2008 |
| JP | 2010-58635 A | 3/2010 |

OTHER PUBLICATIONS

RD 543076 A (English Abstract).*

* cited by examiner

*Primary Examiner* — Jonathan Bradford

(74) *Attorney, Agent, or Firm* — NSIP Law

(57) ABSTRACT

A method and battery system for thermal management of a battery system includes predicting a total heat generation by a battery based on determined internal conditions of the battery, and controlling a selective adjusting of a heat transfer coefficient for the battery based on the predicted total heat generation to maintain an operating temperature of the battery at a target temperature or within a target temperature range.

19 Claims, 6 Drawing Sheets

BATTERY THERMAL MANAGEMENT METHOD AND SYSTEM

CROSS-REFERENCE TO RELATED APPLICATION(S)

This application claims the benefit under 35 USC § 119(a) of Indian Patent Application No. 3838/CHE/2015, filed on Jul. 27, 2015, in the Indian Patent Office, the entire disclosure of which is incorporated herein by reference for all purposes.

BACKGROUND

1. Field

The following description relates to a battery thermal management method and system.

2. Description of Related Art

Lithium ion (Li-ion) batteries provide an option of low weight, high energy density, and slow discharge rates, as compared to other battery technologies. These advantages of the Li-ion batteries, has made them desirable for high energy demanding applications such as electric vehicles. The energy held by lithium-ion cells is multiple times than that of conventional lead acid or nickel cadmium batteries. However, a lithium-ion battery has an inherent problem of overheating leading to thermal runaway. Li-ion battery degrades faster at high temperatures and offers low capacity at low temperature. At very high temperature, the thermal runaway may be triggered in the Li-ion battery due to unwanted exothermic reactions in organic electrolytes. The Li-ion battery typically works best in a narrow band of temperature close to human comfort zone and typically elaborate thermal management systems are used in order to maintain the operating temperature in that band. Thus thermal management may enable maintenance of battery performance, improved battery life, and addresses safety concerns.

Such typical thermal management approaches implement feedback controlled thermal management, i.e. only after a measured temperature of a battery or battery pack exceeds a set threshold, a cooling system is actuated to cool the batteries or the battery pack to below the threshold. However, due to the inherent dependence of the battery electrochemical processes on temperature and the resulting delay before the battery cooling operation is implemented, this typical approach results in higher heat dissipation and inefficient operation. Further, such existing approaches for thermal management do not consider alternate features for thermal management, hence they mostly fail to provide accurate control over operating temperature of the battery.

For example, as noted, in general the thermal management of large battery pack is primarily done through feedback control. However, the heat generation in the battery pack is strongly related to State of Charge (SoC) of the batteries and the discharge rate. Thus, existing feedback control based thermal management approaches fail to provide efficient cooling as they do not predict heat generation by the batteries. This may results in overheating or overcooling of the battery and may lead to hazardous situations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One or more embodiments herein provide a method and a battery system providing thermal management for a battery based on a predictive control mechanism. One or more embodiments herein also provide a method for predicting total heat generation in the battery, based on internal conditions of the battery, wherein the internal conditions include at least one of a State of Charge (SoC) of the battery, a load current drawn by a load connected to the battery and a current temperature of the battery.

One or more embodiments herein provide a method for initiating a thermal cycle of a thermal cycle unit in the battery system to maintain an operating temperature of the battery to a select target temperature or temperature range for the battery.

One or more embodiments herein provide a method and system for computing a power for the thermal cycle unit to initiate the thermal cycle that maintains the operating temperature at the target temperature.

In one general aspect, a method for thermal management of a battery system includes predicting a total heat generation by a battery based on determined internal conditions of the battery, and controlling a selective adjusting of a heat transfer coefficient for the battery based on the predicted total heat generation to maintain an operating temperature of the battery at a target temperature or within a target temperature range.

The determined internal conditions may include at least one of a state of charge (SoC) of the battery, a load current supplied by the battery to a load connected to the battery, and a present operating temperature of the battery.

The controlling of the selective adjusting of the heat transfer coefficient may include controlling a thermal cycle of a thermal cycle unit to increase or decrease the heat transfer coefficient for the battery to maintain the operating temperature of the battery at the target temperature or within the target temperature range. The determined internal conditions may be at least one of a state of charge (SoC) of the battery, a load current supplied by the battery to a load connected to the battery, and a present operating temperature of the battery.

The controlling of the thermal cycle of the thermal cycle unit may include calculating a target heat transfer coefficient for the battery based on a heat transfer difference that depends on the predicted total heat generation, calculating a power required by the thermal cycle unit for the thermal cycle to increase or decrease the heat transfer coefficient of the battery to match the target heat transfer coefficient to maintain the operating temperature of the battery at the target temperature or within the target temperature range, and controlling the thermal cycle unit at the calculated power. The heat transfer difference that depends on the predicted total heat generation may be defined by a plurality of parameters including the predicted total heat generation, an area of heat transfer in the battery, the target temperature or target temperature range, a control time interval for the battery, the present operating temperature of the battery, a present temperature of a controlling element used by the thermal cycle unit to implement the thermal cycle.

The target temperature or target temperature range may be dependent on a user set operating mode of the battery, from among an operating mode for longer battery life of a device being provided power by the battery and an operating mode for improved performance of the device being provided power by the battery.

The power required by the thermal cycle unit may be computed based on ratings of the thermal cycle unit or standard heat transfer relationships obtained for the battery, based on constants, state variables of the battery, and/or empirical relationships of the battery.

The controlling of the selective adjusting of the heat transfer coefficient may include respectively controlling selective adjustments of heat transfer coefficients for each of plural battery modules of the battery based on respectively predicted total heat generations by each battery module.

The predicting of the total heat generation may be performed by one or more processing devices of a thermal management controller and the adjusting of the heat transfer coefficient of the battery is performed to match a target heat transfer coefficient by a thermal cycle unit that operates a thermal cycle based on control by the controlling of the selective adjusting of the heat transfer coefficient by the thermal management controller.

The predicting of the total heat generation by the battery, based on the determined internal conditions of the battery, may include predicting the total heat generation by the battery based on internal conditions of the battery determined through a physics based model of the battery.

In another general aspect, a battery system thermally managing a battery includes a thermal management controller having one or more processing devices configured to predict a total heat generation by a battery based on determined internal conditions of the battery and to control a selective adjusting of a heat transfer coefficient of the battery based on the predicted total heat generation to maintain an operating temperature of the battery at a target temperature or within a target temperature range.

The battery system may further include the battery, a thermal cycle unit to perform the adjusting of the heat transfer coefficient of the battery, and one or more sensors configured to measure physical conditions of the battery used by the thermal management controller to predict the total heat generation.

The thermal management controller may control a thermal cycle of a thermal cycle unit to increase or decrease the heat transfer coefficient of the battery to match a target heat transfer coefficient to maintain the operating temperature of the battery at the target temperature or within the target temperature range. The internal conditions may include a state of charge (SoC) of the battery, a load current supplied by the battery to a load, and a present operating temperature of the battery. The thermal management controller may be configured to calculate the target heat transfer coefficient for the battery based on a heat transfer difference that depends on the predicted total heat generation, calculate a power required of the thermal cycle unit, for the thermal cycle, to increase or decrease the heat transfer coefficient of the battery to match the target heat transfer coefficient to maintain the operating temperature of the battery at the target temperature or within the target temperature range, and control operation of the thermal cycle unit at the calculated power.

The heat transfer difference that depends on the predicted total heat generation may be defined by a plurality of parameters including the predicted total heat generation, an area of heat transfer in the battery, the target temperature or target temperature range, a control time interval for the battery, the present operating temperature of the battery, a present temperature of a controlling element used by the thermal cycle unit to implement the thermal cycle.

The battery system may further include a display with a user interface, wherein the target temperature or target temperature range may be dependent on a user set operating mode of the battery, from among an operating mode for longer battery life of a device being provided power by the battery and an operating mode for improved performance of the device being provided power by the battery, configured to be set through the user interface.

The calculated power may be determined based on ratings of the thermal cycle unit or standard heat transfer relationships obtained for the battery, based on constants, state variables of the battery, and/or empirical relationships for the battery.

The thermal management controller may be further configured to control the selective adjustment of the heat transfer coefficient by respectively controlling selective adjustments of heat transfer coefficients of each of plural battery modules based on respectively predicted total heat generations by each battery modules, when the battery comprises the plural battery modules stacked together in the battery.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
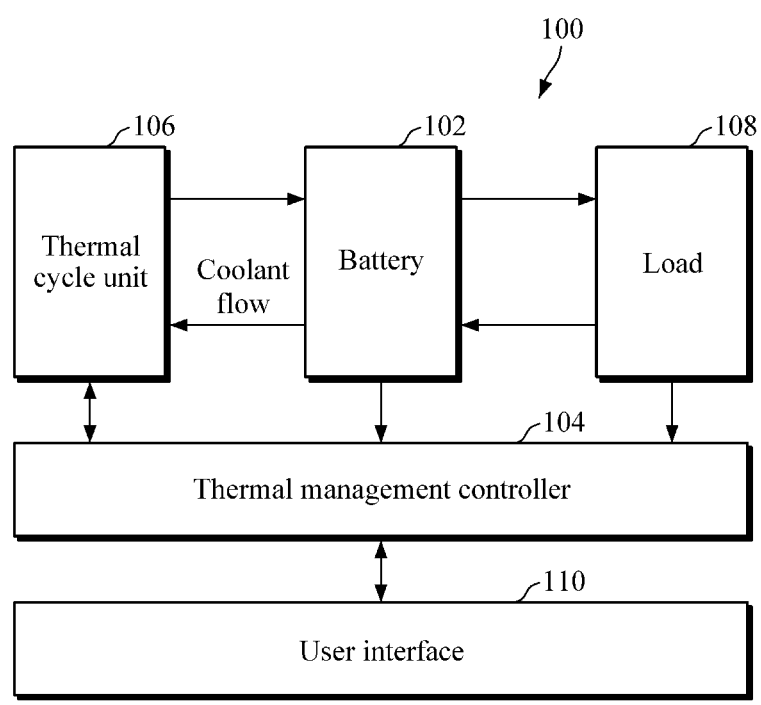
FIG. 1 illustrates a battery system providing thermal management for a battery, according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

One or more embodiments herein provide a thermal management method and battery system of one or more batteries using a predictive control mechanism. The predictive control mechanism of the battery system uses a thermal management controller configured to predict total heat generation (heat generation), in the battery, that effectively controls an operating temperature of the battery. The thermal management controller may include a processor device, such as a processor or computer, or other control hardware. The predicted total heat generation is based on internal conditions of the battery.

Further, the thermal management controller may be configured to maintain the operating temperature of the battery to a select target temperature, e.g., preset for the battery, using the predictive control mechanism. The predictive control mechanism is based on adjusting a current heat transfer coefficient of the battery to a heat transfer coefficient whose value is calculated based on a derived physics based model of the battery. The then current heat transfer coefficient of the battery, when adjusted to the calculated value, may maintain the operating temperature of the battery to the target temperature.

The thermal management controller may be configured to adjust the heat transfer coefficient of the battery to the calculated value by controlling a thermal cycle of a thermal cycle unit in the battery system. The thermal cycle is controlled by controlling an amount of power supplied to the thermal cycle unit, where the power is calculated or determined so as to adjust the heat transfer coefficient to the calculated or determined value. Thus, the thermal management controller may be configured to automatically control power supplied to the thermal cycle unit that provides mechanism for adjusting the heat transfer coefficient of the battery and effectively maintains the battery at target temperature. For example, the thermal management controller may be configured to control the thermal cycle unit based on a prediction of what a heat transfer coefficient of the battery will be without additional or less cooling, to determine how much cooling to apply to maintain a desired thermal range.

Further, in one or more embodiments, the battery system provides a display and user interface (UI) to display various parameters that allow a user to monitor the thermal management in the battery system.

The predictive control approach for used by the battery system is simpler to implement and reduces the energy requirement for running the thermal management compared to feedback only systems. For example, since the battery system utilizes predictive control of the battery system, temperature control response is faster as compared to the aforementioned feedback control approaches that wait for the battery to heat up or cool beyond a threshold before taking a corrective control action. Enhancement in response time for the temperature control in one or more embodiments may be critical in larger battery systems that otherwise could take longer response times for temperature control action and may effectively degrade battery performance.

In an embodiment, the battery is a lithium-ion (Li-ion) battery such as a Lithium Nickel Cobalt Aluminum positive electrode (Li NCA) battery, though embodiments are not limited thereto.

FIG. 1 illustrates a battery system 100 providing thermal management for a battery 102, according to one or more embodiments. In an embodiment, the battery system 100 includes the battery 102 driving a load 108 and is connected to a thermal management controller 104 and a thermal cycle unit 106 for monitoring and controlling the total heat generation in the battery 102. In an embodiment, the thermal management controller is connected to a user interface (UI) 110 that includes a display that provides the user an interface for monitoring battery temperature and thermal cycle unit parameters associated with the thermal management for the battery 102.

The load 108 draws a load current from the battery 102. The load current drawn from the battery 102 generates heat in the battery 102 and increases the operating temperature of the battery. The thermal management controller 104 is configured to predict the total heat generation in the battery 102. The operating temperature of the battery 102 is dependent on the total heat generation in the battery or respective total heat generation in different battery modules or battery packs. The battery system 100 does not consider the total heat generation as a constant term, moreover the total heat generation ($Q_{total}$) is considered to be a function of the internal conditions of the battery that includes a SoC of the battery 102 that is derived from the load current (I) and a current operating temperature of the battery (T or $T_{op}$). The $Q_{total}$ as a function of the SoC of the battery 102 may be calculated through the below example Equations 1, 2, 3, 4 and 5:

$$Q_{total} = Q_{total} \; (SoC \text{ or Capacity}) \quad \text{(EQUATION 1)}$$

$$Q_{total} = Q_{rev} + Q_{irev} + Q_{ohmic} \quad \text{(EQUATION 2)}$$

$$Q_{rev} = K_{rev} I_{load} T_{Op} \frac{\partial E_{eq}(SoC)}{\partial T} \quad \text{(EQUATION 3)}$$

$$Q_{irev} = K_{irev} I_{load} \eta \quad \text{(EQUATION 4)}$$

$$Q_{ohmic} = K_{ohmic}(I_{load})^2 R(T_{Op}) \quad \text{(EQUATION 5)}$$

The constants ($K_{rev}$, $K_{irev}$, and $K_{ohmic}$) depend on cell design and material of the battery 102, and can be determined from an available or provided battery model. The load current ($I_{load}$) and the current operating temperature ($T_{op}$ also referred as T) are measured using standard methods available. For example, either of the thermal cycle unit 106, or battery 102 may include one or more voltage sensor, temperature sensor, current sensor, and/or such sensor may be exterior of the thermal management controller 104, thermal cycle unit 106, or battery 102 and in communication with the thermal management controller 104. Further, the SoC, which is a function of the load current, may be determined by integrating the load current as provided in the example Equation 6 below:

$$SOC = 1 - K_{SOC} \int_0^t I_{load} dt \quad \text{(EQUATION 6)}$$

The cell chemistry, of the battery, e.g., represented by $$\left(\frac{\partial E_{eq}(SoC)}{\partial T}\right),$$

may be determined from experimental results. The over potential ($\eta$) may be determined by the example Tafel Equation 7 provided below:

$$\eta = K_1 + K_2 \log(I_{load}) \quad \text{(EQUATION 7)}$$

The constants ($K_{SOC}$, $K_1$, and $K_2$) are functions of cell design and material property of the battery 102 and may be obtained empirically. Cell resistance ($R(T_{op})$) is a function of the operating temperature and is determined by the battery materials and their composition.

Figure 2:
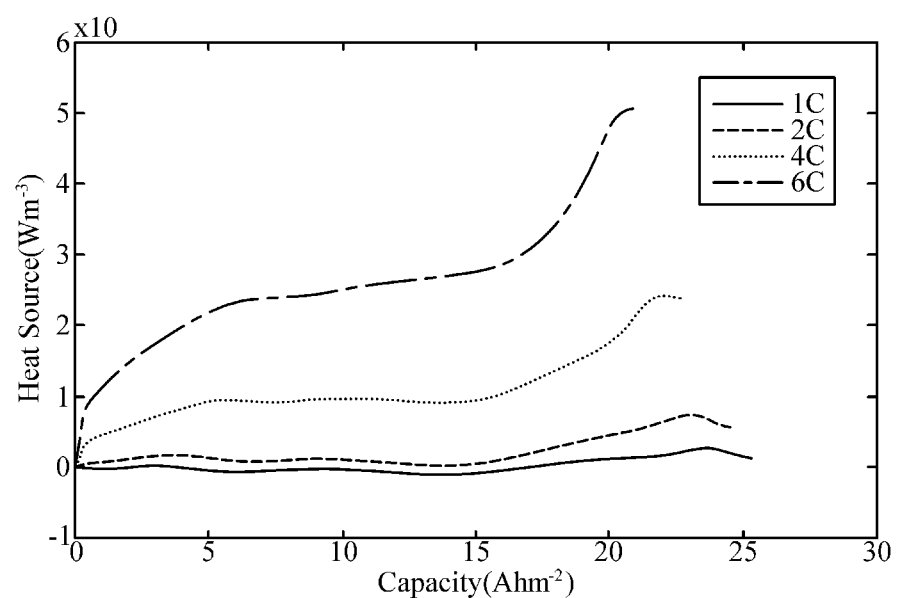
FIG. 2 is a graph illustrating dependence of heat generation in the battery on State of Charge (SoC) of the battery and the discharge rate of the battery, according to one or more embodiments.

A graphical representation indicating dependence of heat generation in the battery 102 on the SoC of the battery 102 and the discharge rate of the battery 102 is described in conjunction with FIG. 2.

Once the total heat generation in the battery 102 is predicted, the thermal management controller 104 is configured to calculate a value of the heat transfer coefficient for the battery 102. The predictive control mechanism of the battery system 100 maintains the current operating temperature to the target temperature by adjusting the current heat transfer coefficient of the battery 102 to the computed value of the heat transfer coefficient. The thermal management controller 104 is configured to calculate the value based on a heat transfer difference equation. The battery system 100 may utilize a modified heat transfer difference equation, such as provided in the example Equation 8 below, where the parameters such as the target temperature ($T_{target}$) determined by an operating mode of the battery and a control time interval ($t_{control}$) preset for the battery provide temperature dependent variables that can be controlled by the user, depending on embodiment.

$$mC_p \frac{T_{target} - T}{t_{control}} = Q_{total} - hA_{ht}(T - T_{inf}) \qquad \text{(EQUATION 8)}$$

In accordance with example Equation 8, the plurality of parameters that affect the heat transfer in the battery 102 include the total heat generation ($Q_{total}$), an area of heat transfer ($A_{ht}$) in the battery 102, the target temperature ($T_{target}$), the control time interval ($t_{control}$) preset for the battery, the current operating temperature (T) of the battery, and a current temperature of the controlling element ($T_{inf}$). For example, the controlling element can be a fluid in which its temperature can be controlled based on the whether a heating thermal cycle or a cooling thermal cycle is to be initiated to maintain the current operating temperature to the target temperature or temperature range.

The thermal management controller 104 is configured to automatically obtain values of plurality of parameters. The area of heat transfer ($A_{ht}$) is determined by the cell design. The target temperature ($T_{target}$) which can be preset is determined by the operating mode (e.g.—long life or high performance of the battery 102). Further, the acceptable control interval ($t_{control}$) is preset value, while the temperature ($T_{inf}$) of the cooling/heating controlling element is determined by a compressor, or fan, used in the thermal cycle unit 106.

Based on the example Equation 8, the thermal management controller 104 computes the heat transfer coefficient (h) for the battery system 100 to maintain the current operating temperature at the target temperature or temperature range. Upon computation of the value of the heat transfer coefficient the thermal management controller 104 controls the thermal cycle of the thermal cycle unit 106. The thermal management controller 104 may control the thermal cycle by controlling the amount of power supplied to the thermal cycle unit. The thermal management controller 104 may compute the power to be supplied to the thermal cycle unit 106 based on ratings of the thermal cycle unit and standard heat transfer relations provided for the battery based on constants, state variables of the battery.

In an embodiment, the power ($P_{thermal}$) to be supplied to operate the thermal cycle unit 106 may be calculated from an empirical relation, such as in Equation 9 below:

$$P_{thermal} = F(h) \qquad \text{(EQUATION 9)}$$

The thermal cycle that is initiated for the temperature control may be a cooling thermal cycle if the current temperature of the battery 102 is higher than the $T_{target}$, or may be a heating thermal cycle if the current temperature of the battery 102 is lower than the $T_{target}$. The thermal management controller 104 may utilize battery power to run the thermal management controller 104 and the thermal cycle unit 106. Thus, a control on the power supplied to the thermal cycle unit effectively reduces the power consumption of the battery 102. Further, based on the power received, the thermal cycle unit 106 maintains parameters of the thermal cycle unit 106 to a desired value so as to automatically adjust the heat transfer coefficient of the battery as required. The parameters of the thermal cycle unit 106 include, but are not limited to, flow rate of a controlling fluid and temperature of the controlling fluid. For example, the fluid may be air, water, or other fluid.

FIG. 1 shows an overview of the battery system 100. The battery system 100 may include a plurality of other components or modules or units that directly or indirectly interact with the components or modules shown in FIG. 1. However, other components are not described here for brevity. Further, the names of the other components of the battery system are illustrative and need not be construed as a limitation imparting any limitation on such components.

For simplicity and ease of understanding, FIG. 1 illustrates the battery system 100 for a single battery module. However, in an embodiment, the battery 102 can be a battery pack that includes plurality of battery modules. The thermal management for the battery system 100 for a battery pack is explained in conjunction with FIG. 4 below.

In an embodiment, the thermal management controller can be combined with existing feedback control methods for the thermal management to provide a two way thermal management with a feedback based thermal control and the predictive based thermal control.

FIG. 2 is a graph illustrating dependence of heat generation in the battery on State of Charge (SoC) of the battery and the discharge rate of the battery, according to one or more embodiments. The graph, which plots heat generation against SoC of an example Li-ion battery, indicates that the heat generation in the Li-ion battery varies with discharge process depending upon the SoC (or remaining capacity). It also varies strongly with discharge rate. Heat generation may vary +/−100% around the average heat generation.

Figure 3:
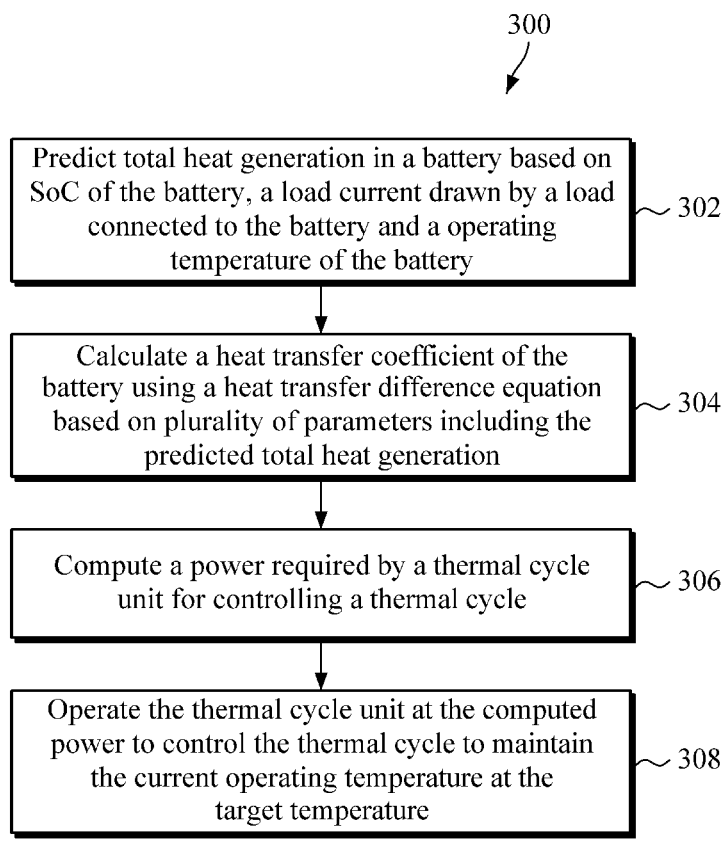
FIG. 3 is a flow diagram illustrating a method for providing thermal management in the battery system, according to one or more embodiments.

FIG. 3 is a flow diagram illustrating a method 300 for providing thermal management in the battery system, according to one or more embodiments as disclosed herein. In an embodiment, the thermal management controller 104 may perform operations 302 through 308, though embodiments are not limited thereto.

At operation 302, the method 300 includes predicting the total heat generation in the battery 102. The total heat generation ($Q_{total}$) is computed based the internal conditions of the battery 102 that include at least one of the SoC of the battery 102, the load current ($I_{load}$) supplied by the battery 102 to the load 108 and the current operating temperature (T or $T_{op}$) of the battery 102. The total heat generation in the battery effectively determines the operating temperature of the battery 102.

Upon computing the total heat generation, the method includes performing actions to maintain the operating temperature of the battery 102 to the target temperature preset for the battery 102. At operation 304, the method includes calculating the heat transfer coefficient of the battery 102 using the heat transfer difference equation (e.g., Equation 8). In an embodiment, one of the parameters, ($Q_{total}$), among the plurality of parameters that to the calculating of the heat transfer coefficient using Equation 8 indicates that the method 300 does not treat ($Q_{total}$) as a constant and may enable improved accuracy in predictive temperature management control proposed. Thus, based on the example Equation 8, the plurality of parameters that are considered by the heat transfer difference equation to compute the value of the heat transfer coefficient include the total heat generation ($Q_{total}$), the area of heat transfer ($A_{ht}$) in the battery 102, the target temperature ($T_{target}$), the control time interval ($t_{control}$) preset for the battery, the current operating temperature (T) of the battery, and a current temperature of the controlling element ($T_{inf}$).

Upon computation or determination of the value of the heat transfer coefficient, at operation 306, the method 300 includes computing a power, to be supplied to the thermal cycle unit 106, required to achieve that heat transfer coefficient. Based on the power supplied, the thermal cycle unit controls the thermal cycle that adjusts the current heat transfer coefficient of the battery to the computed value of the heat transfer coefficient. The power computed to achieve the heat transfer coefficient is based on ratings of the thermal cycle unit 106 and standard heat transfer relationships provided for the battery 102 based on constants and state variables of the battery 102. When there are plural thermal cycle units, respective powers may be calculated.

In an embodiment, the power ($P_{thermal}$) supplied to operate the thermal cycle unit 106 may be calculated from the empirical relation, such as in Equation 9.

At operation 308, the method includes operating the thermal cycle unit 106 at the computed power to control the thermal cycle. The thermal cycle maintains the operating temperature of the battery at the target temperature or temperature range.

The various operations in method 300 may be performed in the order presented, in a different order or simultaneously. Further, in some embodiments, some operations listed in FIG. 3 may be omitted. Here, an implementation of the method 300 in the battery system 100 has been explained in conjunction with FIG. 1, noting that embodiments are not limited thereto.

Figure 4:
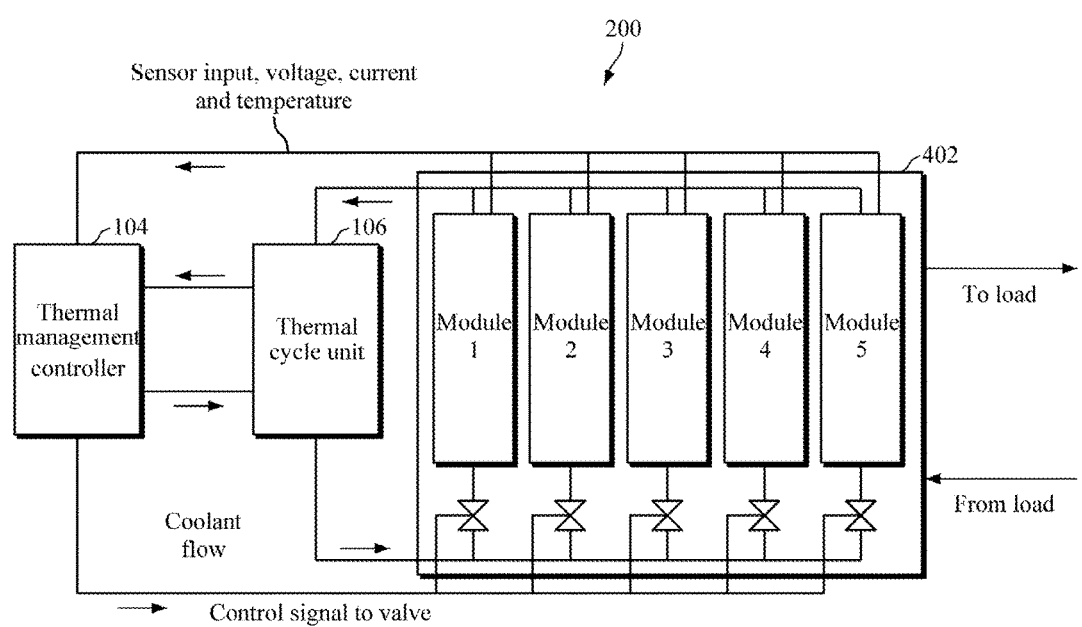
FIG. 4 illustrates a battery system providing thermal management for a battery when the battery includes a plurality of modules stacked together to form a battery pack, according to one or more embodiments.

FIG. 4 illustrates a battery system 200 providing thermal management for the battery when the battery includes a plurality of modules stacked together to form a battery pack 402, according to one or more embodiments as disclosed herein. In an embodiment, the battery system 200 includes the battery pack 402 supplying load current to a load and a thermal management controller 104 provides the predictive thermal control through the thermal cycle unit 106. The battery pack comprises battery modules (module 1 through module 6, for example only) stacked together.

The parameters such as a respective discharge rate and current operating temperature are obtained by the thermal management controller 104 and the thermal management controller 104 predicts the total heat generation in each battery module (module 1 through module 6, for example only). Based on the heat generation predicted for each battery module, the thermal management controller applies differentiable cooling for each battery module and so the predicted heat transfer coefficients can be adjusted for each module. In other words, the cooling and the predicted heat transfer coefficient may be individually varied according to each battery module.

The battery system 200 with the battery pack 402 reduces the non-uniformity of temperature field between each module.

Figure 5A:
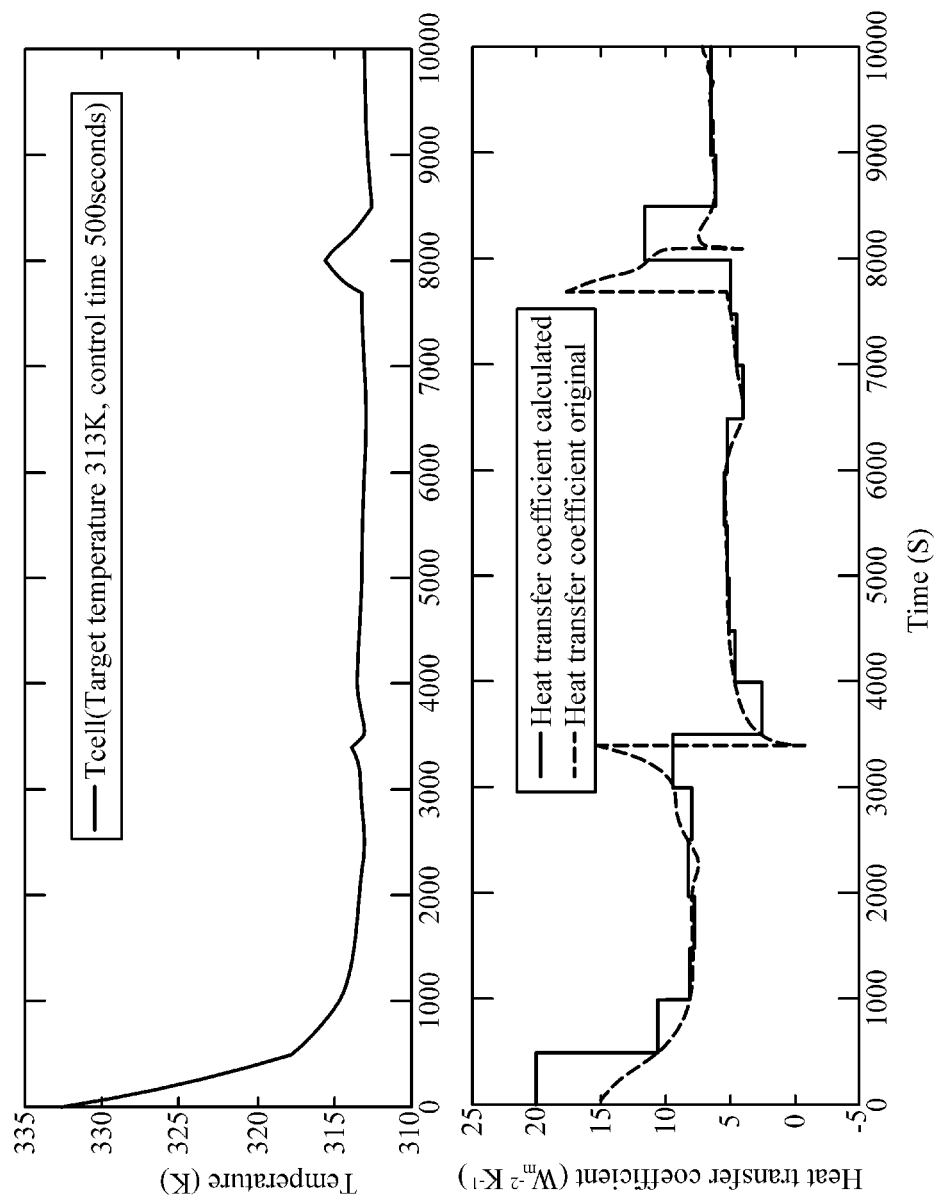
FIGS. 5a and 5b illustrate graphical analysis of simulation results for a battery system, according to one or more embodiments.
Figure 5B:
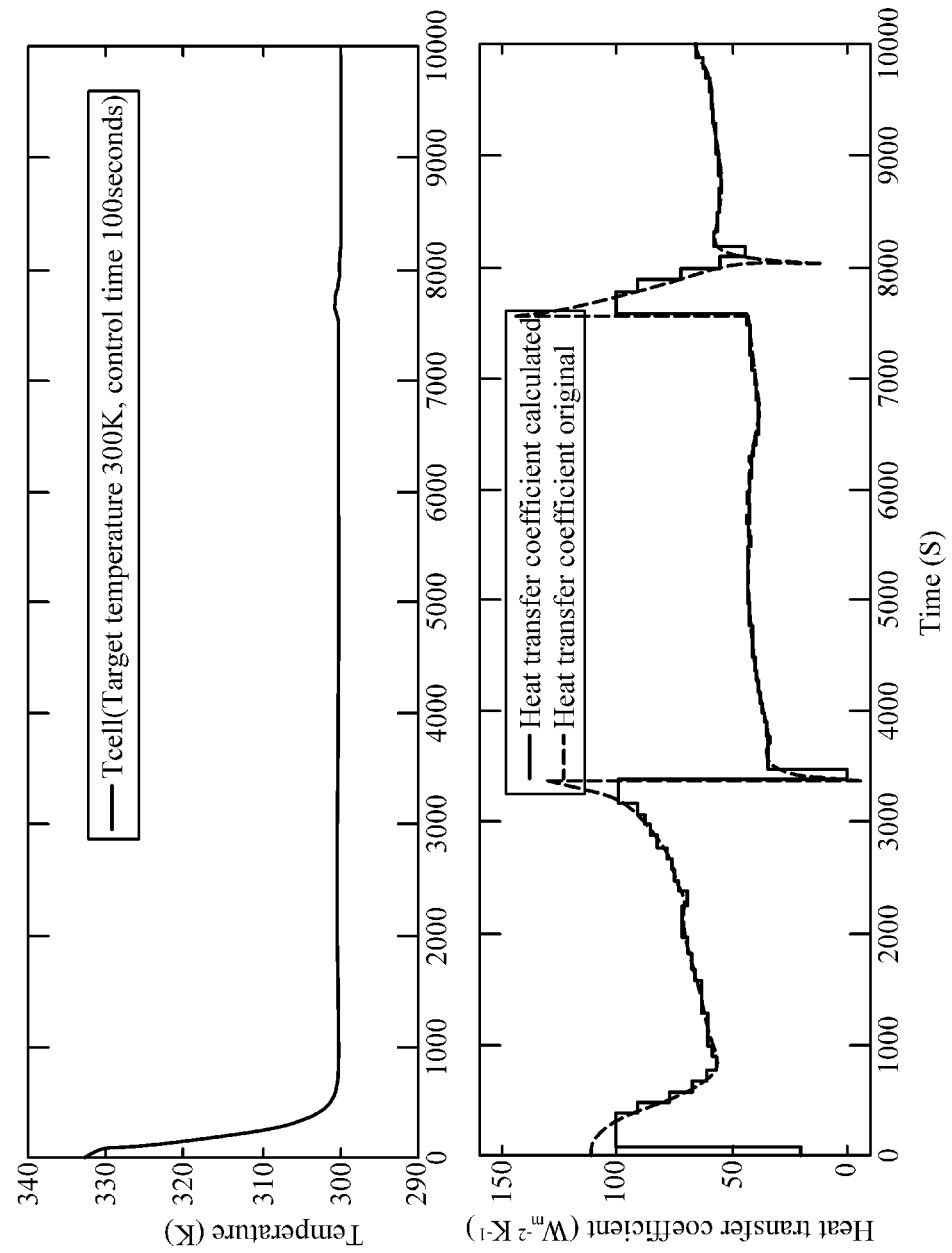

FIGS. 5a and 5b illustrate graphical analysis of simulation results for the battery system, according to one or more embodiments.

Referring to FIGS. 5a and 5b, a simulation of a battery system, according to one or more embodiments, effectively maintains the operating temperature of a battery simulink model (e.g., of the battery 102 of FIG. 1) close to the target temperature without overcooling or overheating. Even with system restriction from other sources (for example, type of coolant or cooling mechanism used) the simulated battery system can keep the operating temperature of the battery simulink model within a close range of the target temperature. Based on the extent to which temperature accuracy is desired, the control interval ($t_{control}$) can be fixed. The battery simulink model is based on a heat transfer coefficient range of 0-100 W/m2K with air as the cooling fluid, for example only. The battery cell of the battery 102 is subjected to 1 C discharge with 333K initial and 300K target temperature, for example only. The original heat transfer coefficient may be predicted from the example Equation 8.

The graph of FIG. 5a indicates results when the actual (computed value) heat transfer coefficient has a period of 500 seconds ($t_{control}$=500 s). The results indicate that the operating temperature of the battery simulink model is brought down to the target temperature and it remains within 5K of the target temperature. The heat transfer coefficients (HTCs) closely follow each other.

The graph of FIG. 5b indicates that the time period of actual heat transfer coefficient implementation is reduced to 100 seconds ($t_{control}$=100 s). The results show that temperature is brought down to target temperature faster as compared to FIG. 5a and it remains within 1K of the target temperature. The HTCs closely follow each other.

The apparatuses, units, modules, devices, and other components illustrated in FIGS. 1-5b that perform the operations described herein with respect to FIGS. 1-5b are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-5b. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-5b that perform the operations described herein with respect to FIGS. 1-5b are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method for thermal management of a battery system, the method comprising:
   predicting a total heat generation by a battery based on internal conditions of the battery;
   calculating a target heat transfer coefficient for the battery based on a heat transfer difference that depends on the predicted total heat generation; and
   controlling a selective adjusting of a heat transfer coefficient for the battery based on the target heat transfer coefficient to maintain an operating temperature of the battery at a target temperature or within a target temperature range.

2. The method of claim 1, wherein the internal conditions comprise at least one of a state of charge (SoC) of the battery, a load current supplied by the battery to a load connected to the battery, and a present operating temperature of the battery.

3. The method of claim 1, wherein the controlling of the selective adjusting of the heat transfer coefficient comprises controlling a thermal cycle to increase or decrease the heat transfer coefficient for the battery to maintain the operating temperature of the battery at the target temperature or within the target temperature range.

4. The method of claim 3, wherein the internal conditions comprise at least one of a state of charge (SoC) of the battery, a load current supplied by the battery to a load connected to the battery, and a present operating temperature of the battery.

5. The method of claim 3, wherein controlling of the thermal cycle comprises:
   calculating a power required for the thermal cycle to increase or decrease the heat transfer coefficient of the battery to match the target heat transfer coefficient to maintain the operating temperature of the battery at the target temperature or within the target temperature range; and
   controlling the thermal cycle at the calculated power.

6. The method of claim 5, wherein the heat transfer difference that depends on the predicted total heat generation is defined by a plurality of parameters comprising:
   the predicted total heat generation;
   an area of heat transfer in the battery;
   the target temperature or target temperature range;

a control time interval for the battery;
the present operating temperature of the battery; and
a present temperature of fluid used for the thermal cycle.

7. The method of claim 6, wherein the target temperature or target temperature range is dependent on a user set operating mode of the battery, from among an operating mode for longer battery life of a device being provided power by the battery and an operating mode for improved performance of the device being provided power by the battery.

8. The method of claim 5, wherein the power required for the thermal cycle is computed based on ratings of the thermal cycle or standard heat transfer relationships obtained for the battery, based on constants, state variables of the battery, and/or empirical relationships of the battery.

9. The method of claim 3, wherein the controlling of the selective adjusting of the heat transfer coefficient comprises respectively controlling selective adjustments of heat transfer coefficients for each of plural battery modules of the battery based on respectively predicted total heat generations by each battery module.

10. The method of claim 1, wherein the predicting of the total heat generation by the battery comprises predicting the total heat generation by the battery based on the internal conditions of the battery determined through a physics based model of the battery.

11. A battery system thermally managing a battery, comprising:
a processor configured to:
predict a total heat generation by a battery based on internal conditions of the battery;
calculate a target heat transfer coefficient for the battery based on a heat transfer difference that depends on the predicted total heat generation; and
control a selective adjusting of a heat transfer coefficient of the battery based on the target heat transfer coefficient to maintain an operating temperature of the battery at a target temperature or within a target temperature range.

12. The battery system of claim 11, further comprising:
the battery; and
one or more sensors configured to measure physical conditions of the battery to predict the total heat generation,
wherein the processor is further configured to perform the adjusting of the heat transfer coefficient of the battery.

13. The battery system of claim 11, wherein the processor is further configured to control a thermal cycle to increase or decrease the heat transfer coefficient of the battery to match the target heat transfer coefficient to maintain the operating temperature of the battery at the target temperature or within the target temperature range.

14. The battery system of claim 11, wherein the internal conditions comprise:
a state of charge (SoC) of the battery, a load current supplied by the battery to a load, and a present operating temperature of the battery.

15. The battery system of claim 11, wherein the processor is further configured to:
calculate a power required for the thermal cycle, to increase or decrease the heat transfer coefficient of the battery to match the target heat transfer coefficient to maintain the operating temperature of the battery at the target temperature or within the target temperature range; and
control operation of the thermal cycle at the calculated power.

16. The battery system of claim 11, wherein the heat transfer difference that depends on the predicted total heat generation is defined by a plurality of parameters comprising:
the predicted total heat generation;
an area of heat transfer in the battery;
the target temperature or target temperature range;
a control time interval for the battery;
the present operating temperature of the battery; and
a present temperature of fluid used for the thermal cycle.

17. The battery system of claim 16, further comprising a display with a user interface, wherein the target temperature or target temperature range is dependent on a user set operating mode of the battery, from among an operating mode for longer battery life of a device being provided power by the battery and an operating mode for improved performance of the device being provided power by the battery, set through the user interface.

18. The battery system of claim 15, wherein the calculated power is determined based on ratings of the thermal cycle or standard heat transfer relationships obtained for the battery, based on constants, state variables of the battery, and/or empirical relationships for the battery.

19. The battery system of claim 15, wherein the processor is further configured to control the selective adjustment of the heat transfer coefficient by respectively controlling selective adjustments of heat transfer coefficients of each of plural battery modules based on respectively predicted total heat generations by each battery modules, when the battery comprises the plural battery modules stacked together in the battery.

* * * * *